UNITED STATES PATENT OFFICE.

HENRY D. COOKE, OF MONMOUTH BEACH, NEW JERSEY, ASSIGNOR TO AMERICAN FARM PRODUCTS COMPANY, OF JERSEY CITY, NEW JERSEY, A CORPORATION OF NEW JERSEY.

METHOD OF EXTRACTING OR OBTAINING BUTTER-FAT.

No. 875,325.      Specification of Letters Patent.      Patented Dec. 31, 1907.

Application filed September 14, 1906. Serial No. 334,609.

*To all whom it may concern:*

Be it known that I, HENRY D. COOKE, a citizen of the United States, and a resident of Monmouth Beach, New Jersey, have invented a certain new and useful Method of Obtaining Butter-Fat, of which the following is a specification.

The object of this invention is to derive butter fat directly from milk in a simple and comparatively inexpensive manner. So far as I am aware butter fat has never been obtained heretofore except as a derivative of butter which may or may not have undergone decomposition.

As distinguished from the old methods of deriving butter fat my invention consists in extracting the fat directly from milk, that is, without first going through the butter stage or in other words without first producing butter.

In order that the foregoing statement of invention may be the more readily understood and in order to make the description which follows perfectly clear I will proceed first to refer to the nature of butter and to explain the use of the terms which I employ in setting forth my invention.

Fresh milk, as is well known, contains a very large number of minute globules of varying sizes held in suspension therein and which, if the milk be allowed to stand, rise to the surface thereof and produce what is known as cream. If the milk be agitated, or if the cream be removed from the milk and agitated, thereby driving these globules against each other forcibly, the globules will adhere to each other and form a conglomerated and well defined mass which is known chemically as butter. I use the term "butter", therefore, in its chemical sense to refer to these globules when thus conglomerated or welded.

The exact nature of the globules while they are in suspension in the milk is not fully understood at the present time; but on the other hand when these globules have been worked into the conglomerated mass known as butter, as just referred to, the composition of the mass is easy to determine. When in a fresh condition the two largest constituents of butter are absolute fat and water, and the relative proportions of fat and water vary according to the different sources from which the milk is obtained. Some butter contains as high as 95 per centum of fat while other butter will contain as high as 35 per centum of water. The average butter contains about 87 per centum of fat and 12 per centum of water. The other constituents of butter are casein, milk sugar and a few salts. Butter fat, therefore, as the term is used herein, consists of the absolute fat in milk or in butter; that is, butter deprived of its proportion of water, casein, milk sugar and salts. While the globules are suspended within the milk, they appear to contain this butter fat in liquid form surrounded by a film or envelop, and it is quite possible that this film is made up of the non-fatty constituents of butter which have just been enumerated, although this fact has not been determined by me or by anybody heretofore so far as I can ascertain. By milk, I refer to any substance containing these fat globules, whether it be, for example, cow's milk in its natural condition and either sweet or sour, or cream in which the globules are relatively much more numerous and whether fresh or sour, or any other liquid in which the globules are suspended in varying relative proportions. Moreover, goat's milk and asses' milk or the milk of any other animals are included within this term.

In accordance with my improved process, I first subject milk to such physical disturbance as will produce therefrom a thickened liquid homogeneous mass or emulsion. For this purpose I find that the best results are obtained when the milk is comparatively cold. The disturbance in the milk is produced preferably by delivering the milk in a thin layer between two disks rotating in opposite directions very rapidly, the opposing surfaces of the disks between which the milk flows being roughened and very near together. By treating the milk in this manner, my investigations lead me to believe that I produce a disruptive strain which breaks, shears, lacerates, punctures, fractures or otherwise ruptures the films or inclosing envelops of the globules. It is possible that other methods of creating a violent disturbance in the milk sufficient to produce this disruptive effect may be employed, but I have found that the shearing action just referred to works exceedingly well.

My treatment of the milk is essentially different from that employed in producing butter, inasmuch as I do not produce any well defined mass like butter or any liquid like butter-milk. On the other hand, the whole of the treated milk or in other words the total yield which is produced by the disturbance above referred to is an emulsion or in other words, a thickened liquid mass apparently homogeneous throughout. When the milk has thus been converted into thickened homogeneous mass or emulsion, the butter fat may be immediately extracted by heating. The heating causes the butter fat to rise as a liquid to the top of the mass whence it may be removed by a siphon or in any other well known manner. It is possible that the butter fat may be extracted without heating, my investigations leading me to believe that the heating releases, liberates or separates the absolute fat from the broken envelops or films, so to speak, the released and separated fat being of comparatively low specific gravity then easily rising above the rest of the mass. I have not determined as yet however that all of the butter fat may be extracted without the heating as just explained.

After the butter fat has been drawn off or otherwise removed from the top of the mass and allowed to cool, it solidifies. It is obvious that it may be treated with hot water and the like to thoroughly cleanse it and eliminate therefrom any salts or other soluble substances which may have been entrained therewith in removing it.

1. The process of obtaining butter fat from milk which consists in converting the milk into a thickened homogeneous liquid mass or emulsion and then extracting the butter fat therefrom.

2. The process of obtaining butter fat from milk which consists in converting the milk into a thickened homogeneous liquid mass or emulsion and then heating the mass to extract the butter fat therefrom.

3. The process of obtaining butter fat from milk which consists in violently disturbing the milk to produce a thickened homogeneous liquid mass or emulsion and then extracting the butter fat therefrom.

4. The process of obtaining butter fat from milk which consists in violently disturbing the milk to produce a thickened homogeneous liquid mass or emulsion and then heating the mass to extract the butter fat therefrom.

5. The process of obtaining butter fat from milk which consists in breaking the fat globules in the milk and then extracting the butter fat therefrom.

6. The process of obtaining butter fat from milk which consists in breaking the fat globules in the milk and then heating the mass to extract the butter fat therefrom.

7. The process of obtaining butter fat from milk which consists in disturbing the milk in such a way as not to produce butter and then heating the disturbed milk to extract the butter fat.

8. The process of obtaining butter fat from milk which consists in disturbing the milk without causing the fat globules to conglomerate into a defined mass and then heating the disturbed milk to extract the butter fat.

9. The process of obtaining butter fat from milk which consists in shearing the milk while in a thin layer and then heating the sheared milk to extract the fat.

10. The process of obtaining butter fat from milk which consists in subjecting the milk to a disturbance to release the fat and then heating the whole body of the milk to separate the fat.

11. The process of obtaining butter fat from milk which consists in disturbing the milk while cold and then heating the disturbed milk sufficiently to cause the butter fat to rise as a liquid to the top.

12. The process of obtaining butter fat from milk which consists in disturbing the milk in such a way as to form a thickened homogeneous liquid mass or emulsion, heating said mass to cause the butter fat to rise to the top and then removing the butter fat from the rest of the mass.

13. The process of obtaining butter fat from milk which consists in rupturing the fat globules to release the butter fat from the containing films, separating the butter fat from said films, and then removing the butter fat from the rest of the mass.

14. The process of obtaining butter fat from milk which consists in applying a disruptive strain to the milk while in a thin layer to break the fat globules and then applying heat to release the butter fat from the broken films.

15. The process of obtaining butter fat from milk which consists in producing a thickened homogeneous liquid mass or emulsion from the whole of the milk and then heating said mass to extract the butter fat.

16. The process of obtaining butter fat from milk which consists in rupturing the fat globules, heating the mass containing the ruptured globules and then removing the butter fat from the rest of the mass.

17. The process of obtaining butter fat from milk which comprises the breaking of the fat globules in the milk without first forming butter therefrom.

18. The process of obtaining butter fat from milk which comprises the breaking of the fat globules in the milk without first separating the fat globules from the other constituents of the milk and then removing the released butter fat.

This specification signed and witnessed this seventh day of September A. D., 1906.

HENRY D. COOKE.

Signed in the presence of—
ANNA H. COOKE,
HENRY J. BIGELOW.